Sept. 23, 1947.  V. C. MIRONOWICZ  2,427,919
DYNAMOTOR
Filed May 20, 1943  3 Sheets-Sheet 1

VLADIMIR C. MIRONOWICZ
INVENTOR.

BY David M. Davis
HIS ATTORNEY

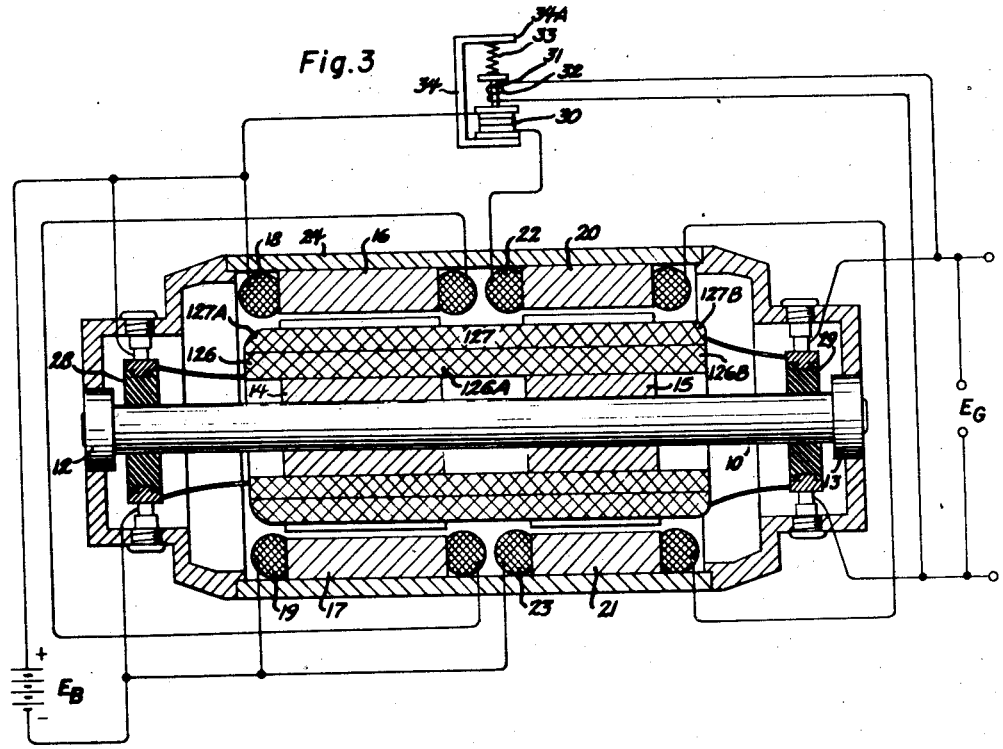

Sept. 23, 1947.  V. C. MIRONOWICZ  2,427,919
DYNAMOTOR
Filed May 20, 1943  3 Sheets-Sheet 3

VLADIMIR C. MIRONOWICZ.
INVENTOR.

BY David M. Davis
HIS ATTORNEY

Patented Sept. 23, 1947

2,427,919

UNITED STATES PATENT OFFICE 2,427,919

DYNAMOTOR

Vladimir C. Mironowicz, Sioux City, Iowa, assignor to Wincharger Corporation, a corporation of Minnesota Application May 20, 1943, Serial No. 487,677

2 Claims. (Cl. 171—123)

This invention relates to rotating electrical machinery of the type which is arranged to convert an electrical input into an electrical output of different voltage.

In the classical dynamotor or converter having a single field and two armature windings on the same core and in which one of the armature windings serves as a motor winding and the other as a generator winding, changes in applied voltage to the motor are reflected as substantially linear changes in the generator output voltage. In many instances it is desirable or necessary to maintain constant the voltage output of the dynamotor regardless of changes in applied voltage to the motor portion of the dynamotor.

Where it is desirable to maintain the output voltage of such a machine substantially constant as the input voltage thereto varies, it is, of course, desirable to use the smallest amount and weight of auxiliary regulating equipment. It is also desirable that the output voltage be maintained substantially constant by the auxiliary equipment without "hunting." Since weight requirements are especially important in aircraft, it is oftentimes desirable or necessary that the auxiliary equipment necessary to impart a flat output voltage characteristic to such a machine for use in aircraft be of the minimum size and weight.

It is therefore an object of this invention to provide new and improved means for keeping the generator voltage of such rotating electrical machinery constant as the voltage input thereto varies over a large range where the overall size and weight of the machinery and the regulating means is minimum.

Another object of this invention is to provide a novel arrangement of dynamotor windings which operate with auxiliary regulating equipment of small size and weight.

Another object of this invention is to achieve the above mentioned objects by simple mechanical and electrical construction in the dynamotor.

The features of my invention which I believe to be novel are set forth with particularity in the appended claims. My invention itself, both as to its organization and manner of operation, together with further objects and advantages thereof may best be understood by reference to the following description taken in connection with the accompanying drawings in which:

Figure 3 shows a different embodiment of the invention;

Figure 4 shows a developed detail view of certain parts of the arrangement of Figure 3;

Figure 5 illustrates graphically certain operating characteristics of the arrangement of Figure 3;

Figure 1:
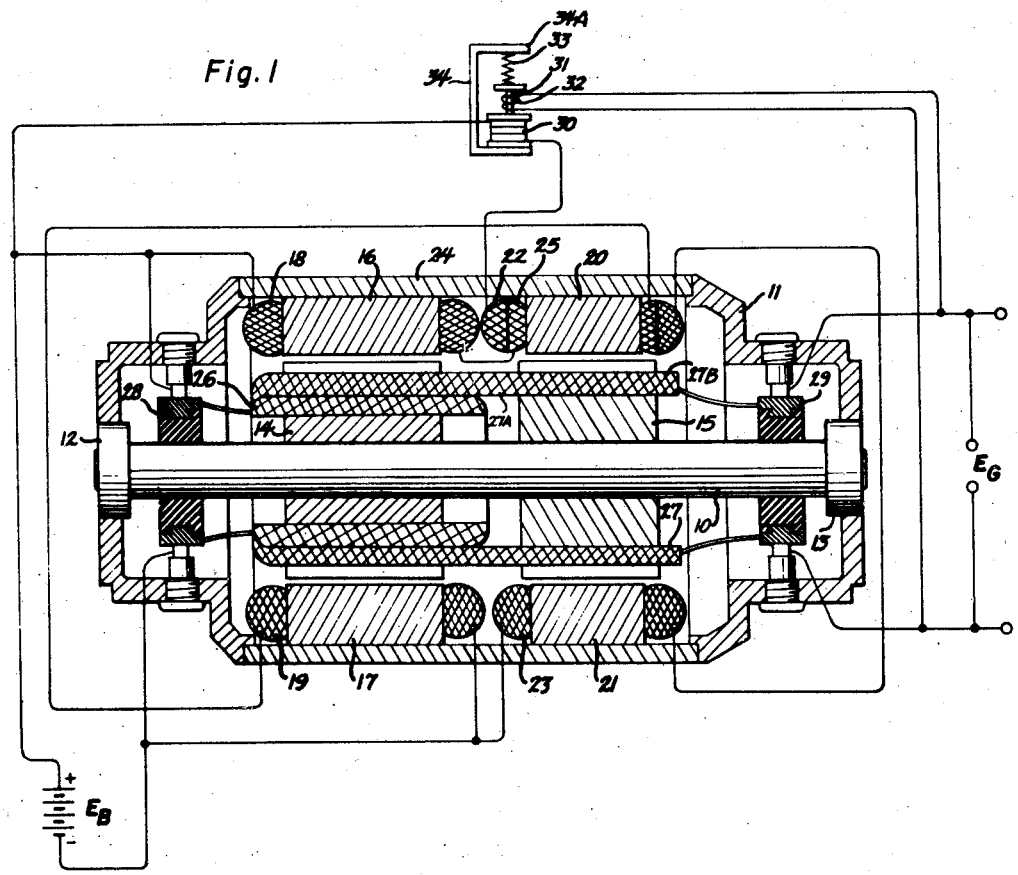
Figure 1 illustrates a preferred embodiment of the invention.

In the improved dynamotor shown in Figure 1, armature shaft 10 is rotatively mounted in dynamotor frame 11 by means of bearings or antifriction means 12 and 13. The armature shaft 10 has securely mounted thereon in spaced relationship the laminated cores 14 and 15. The laminated armature core 14, hereinafter called the main armature core, carries the main sections of the armature windings. The laminated armature core 15, hereinafter called the armature booster or auxiliary core, carries booster or regulating sections of the armature windings. Dynamotor frame 11 has securely mounted thereon oppositely disposed main poles 16 and 17 which carry the main field windings 18 and 19 respectively. Only one pair of main field poles is shown but it is understood, of course, that the machine may have incorporated therein more than one pair of poles. The poles 16 and 17 on the dynamotor frame are aligned with the cooperating main armature core 14 so as to transmit magnetic flux therethrough.

Poles 20 and 21 securely mounted on the dynamotor frame 11 carry thereon booster or regulating windings 22 and 23 respectively. The poles 20 and 21, hereinafter called the field booster or regulating poles, are in magnetically cooperating relationship with armature booster or auxiliary core 15.

The encircling frame portion 24 serves as a yoke and provides a magnetic flux path between the ends of main field poles 16 and 17. It is understood, of course, that a yoke for main field poles 16 and 17 may take other forms. Also the encircling frame portion 24 serves as a yoke and provides a magnetic flux path between booster or regulating poles 20 and 21. The return yoke for booster poles 20 and 21 may, of course, take other forms, as is well known in the art. It is important to note that the magnetic flux path formed by main field poles 16 and 17 and main armature core 14 and yoke 24 is entirely separate and distinct from the magnetic circuit provided by booster field or regulating cores 20 and 21, armature booster or auxiliary core 15 and yoke 24.

Booster or regulating field pole 20 has wound thereon an additional winding 25 which is adapted to produce a magnetic effect on its associated magnetic circuit opposite to that produced by booster or regulating windings 22 and 23. The winding 25 is hereinafter referred to as the differential booster or regulating winding. It is understood, of course, that the differential booster or regulating winding 25 may be a single winding on pole 21 or it may partake of a plurality of windings disposed on both booster or regulating poles 20 and 21, or in other convenient parts of the booster magnetic circuit.

The armature windings of the machine comprise a motor winding 26 and a generator winding 27. The motor armature winding 26 is wound exclusively on the main armature core 14 and is influenced only by magnetic flux from poles 16 and 17. The generator armature winding 27 comprises a main section 27A wound on the main armature core 14 and a generator booster or auxiliary section 27B wound on the armature auxiliary core 15. It is important to note that the generator armature main section 27A is influenced only by magnetic flux from poles 16 and 17 and the generator armature section 27B is influenced only by magnetic flux from booster or regulating poles 20 and 21.

The motor armature winding 26 is electrically connected to a conventional commutator 28 on the left hand side of the machine, and the generator armature winding 27 is provided with a conventional commutator 29 on the right hand side of the machine. Electrical contact is made to the revolving commutators 28 and 29 by carbon brushes in conventional manner.

This dynamotor machine is connected with a suitable source $E_b$ of operating current and with output voltage regulating means as follows. The carbon brushes running on commutator 28 are connected respectively to opposite terminals of the source $E_b$, which may, for example, be a storage battery of suitable voltage. In addition, the main field winding 18 and 19 and the differential booster or regulating winding 25 are all connected in series between the opposite terminals of the source $E_b$. Also, the booster or regulating windings 22 and 23 are connected in series with each other and between the opposite terminals of the source $E_b$ through a series circuit including a variable resistor 30. The resistor 30 is preferably of the pressure dependent type such as resistors made up of loosely packed carbon particles or carbon plates. In the preferred form the resistor 30 is of carbon and, as the carbon particles or plates comprising the resistor are pressed into engagement with one another, the resistance of the resistor is decreased, and the opposite effect is obtained as pressure on the resistor is reduced. The pressure on resistor 30 may be varied by varying the position of magnetic solenoid plunger 31, which assumes a position depending upon the current flowing through solenoid winding 32. Compression spring 33 disposed between movable solenoid plunger 31 and rigid extension 34A of resistor bracket 34 maintains the resistance of resistor 30 at a predetermined amount when no current flows through solenoid 32. As current through solenoid 32 increases, the plunger 31 rises thus relieving pressure on the initially spring pressed resistor 30, and its resistance value increases. The solenoid winding 32 is connected directly across the generator armature commutator 29 through the carbon bushes which run on that commutator.

The operation of the arrangement shown in Figure 1 is as follows: When the voltage source $E_B$ is decreased for any reason whatsoever the voltage appearing across generator commutator 29 tends to decrease if the action of booster coils 22 and 23 and differential coil 25 and associated circuits be disregarded. As the dynamotor output voltage, $E_G$, across commutator 29 decreases, less current flows through solenoid 32 and the compression spring 33, acting against a smaller magnetic force, causes resistance 30 to become smaller. Lowering resistance 30 causes an increase in current flow through the dynamotor booster fields 22 and 23 and the dynamotor output voltage, $E_G$, rises accordingly.

Now, if the action of differential booster winding 25 be considered; as the voltage of source $E_B$ decreases, less magnetic flux from differential booster winding 25 flows through the generator armature booster section 27B with the net result that a smaller increment of flux has to be supplied from booster windings 22 and 23 in order to maintain the same generator voltage output. The magnetic flux produced by differential winding 25 is, in this instance, a fractional part of the magnetic flux transmitted due to the action of booster coil windings 22 and 23.

Conversely, when the input voltage $E_B$ increases the output voltage $E_G$ is maintained constant due to the net effect produced by booster fields 22 and 23 and differential booster field 25, and, secondly, due to variations produced in resistor 30. As the input voltage, $E_B$, increases the output voltage, $E_G$, tends to increase; but, since the current through differential field 25 increases also, an increased reverse or "bucking" voltage is induced in the generator armature section 27B, and hence the output voltage $E_G$ tends to increase less rapidly than if the differential field were not present. Accordingly, due to the net effect produced by booster windings 22 and 23 and differential winding 25, only a relatively small adjustment of resistor 30 is necessary to maintain constant output voltage $E_G$. In the absence of differential winding 25, a much greater adjustment of resistor 30 is necessary in order to maintain constant output voltage $E_G$.

Figure 2:
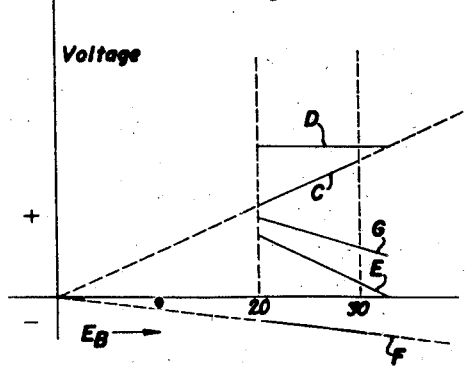
Figure 2 shows graphically certain operating characteristics of the arrangement of Figure 1.

The advantage of using a differential winding such as differential winding 25 may perhaps be more readily perceived from an explanation in connection with Figure 2, wherein is shown the operating characteristics of a dynamotor having no magnetic saturation and in which the effect of voltage drop across resistance is neglected except in the case of resistance 30. Curve C represents the variation of voltage generated in generator armature section 27 as the input voltage $E_B$ varies. In this figure the voltage of the source $E_b$ is plotted as abscissa and the output voltage of the dynamotor machine measured across the brushes running on commutator 29 is plotted as ordinate. Curve D represents the desired dynamotor generator output voltage as the input voltage $E_B$ varies. Curve E represents the variation of a corrective voltage which must be added to the voltage represented by curve C in order to obtain a voltage as represented by curve D. Curve F represents the variation of voltage induced in generator armature section 27B due to flux from differential winding 25, and it is noted that this voltage is negative with respect to the other voltages. Curve G represents the variation of voltage induced in generator armature section 27B necessary to obtain corrective voltage as in curve E when the differential winding 25 is present. Corresponding voltages of curves F and G, when added algebraically, give a voltage corresponding to curve E.

Without differential winding 25, the carbon resistor 30 would have to be varied so that the voltage generated in generator booster section 27B varies as shown in curve E, but when the differential winding 25 is present the voltage induced in generator section 27B due to flux from booster windings 22 and 23 need only vary as in curve G. It is important to note that the slopes of curves G and E are substantially different, and in that fact lie the beneficial results obtained by using differential winding 25. That is, since the slope of curve G is not as great as the slope of curve E, a smaller variation of resistor 30 is necessary to produce curve G than to produce curve E.

There are actually two important effects achieved by the differential field winding 25 in the arrangement of Figure 1, of which the most important effect may be explained in another manner somewhat as follows. Disregard entirely any change in the flux produced by the differential field winding 25 and regard it as a constant flux somewhat smaller than the minimum flux produced by the auxiliary field winding 22 and 23 during their operation. Without that differential flux, assume that it be desired to have an amount of voltage regulation requiring a change in the flux produced by coils 22 and 23 of which the ratio of maximum flux to minimum flux is 2. In such case, it is obvious that the resistance 30 would have to be adjusted sufficiently so that the ratio of its maximum resistance to minimum resistance would have to be at least 2. Now, to obtain exactly the same amount of voltage regulation, if the constant bucking flux produced by the coil 25 be made 10/11 of the minimum flux produced by the coils 22 and 23 during their adjustment, the ratio of maximum flux produced by coils 22 and 23 to the minimum flux produced by them need only be 12/11 and correspondingly, the resistance 30 need only be adjusted over a very small range so that the ratio of maximum resistance to its minimum resistance is not much greater than 12/11. With such a small range of adjustment required for the resistance 30, it can be made very much lighter and smaller than if it were required to change current through the coils 22 and 23 between maximum and minimum current having a ratio of 2 and the entire arrangement can be made very substantially smaller and lighter. The secondary effect produced by the change in flux actually produced by the coil 25 makes this necessary range of adjustment of resistance 30 even smaller.

While in Figure 1, winding 25 is illustrated as being connected in series with the main field windings 18 and 19, so that a relatively constant current flows therethrough, it is entirely within the scope of this invention to energize the coil 25 in any suitable manner with relatively constant current, and as explained previously, preferably with current which decreases as the voltage of source $E_b$ decreases. For example, the coil 25 may be energized by connecting it directly in shunt with source $E_b$ in which case the resistance of coil 25 should be large, or by connecting it in series with the motor or generator armature winding or even in shunt with the generator output terminals or in series with the voltage coil 32 of the voltage regulator including resistance 30. In any such case, the resistance and the current carrying capacity of the conductor put into coil 25 must be suitable for this particular current, and the ampere turns of the coil 25 must be suitable to provide the desired differential flux. It is, of course, preferred, as explained above, in any case, that the source from which coil 25 be supplied shall, if it varies at all during regulation, vary in an opposite sense to the variation of current in coils 22 and 23 caused by adjustment of resistance 30.

In Figure 3 the dynamotor illustrated is similar to the machine shown in Figure 1 with a difference that, in the machine of Figure 3, the motor armature winding 126 having sections 126A and 126B extends over to and is wound on the auxiliary armature core 15. Also, the generator armature winding 127 has a main section 127A wound on the main armature core 14 and a reversed section 127B wound on the auxiliary core 15. The machine of Figure 3 has two independent magnetic circuits, that is, a main magnetic circuit comprising main armature core 14, main field poles 16 and 17 and a portion of the dynamotor frame 24 which acts as a yoke; and the auxiliary magnetic circuit which comprises auxiliary armature core 15, regulating field cores 20 and 21 and the magnetic encircling portion 24 which serves as a yoke.

The regulating windings 22 and 23 produce a flux of such polarity that voltage induced in generator armature section 127B is in such a direction as to add to the voltage generated in main generator armature section 127A. The magnetic effect of regulating windings 22 and 23 on the motor armature section 126B, by reason of the reverse relation between motor and generator armature windings on core 15, is to induce a voltage therein in opposition to the voltage induced in main motor armature winding section 126A by the magnetic effect of windings 18 and 19. In other words, referring to Figure 4, the following voltage relations exist respectively in the generator and motor armature windings:

$$V_{29} = E_{127A} + E_{127B} \quad (1)$$
$$V_{28} = E_{126A} - E_{126B} \quad (2)$$

where $V_{28}$ and $V_{29}$ are the voltages appearing across commutators 28 and 29 respectively, and voltages E in the various armature sections have subscripts corresponding to the numbers applied to the various armature sections.

If the effect of resistance is neglected, the following relationship must hold:

$$E_B = E_{126A} - E_{126B} \quad (3)$$

The voltage output $E_G$ of the machine is the voltage generated in main generator armature section 127A plus the voltage generated in generator armature section 127B. That is, $E_G = V_{29}$ of Equation 1. As the generated voltage $E_G$ tends to fall off, for instance, due to a decrease in input voltage $E_B$, the carbon resistor 30 is decreased due to the joint action of generator voltage responsive solenoid winding 32 upon movable magnetic plunger 31 and compression spring 33. As explained above, the resistance of carbon resistor 30 is changed in magnitude to regulate the generator output voltage in such a manner as to make it substantially independent of variations in input voltage $E_B$.

Another important regulating effect is introduced due to the electrically reversed motor armature section 126B; that is, as the input voltage $E_B$ decreases the output voltage $E_G$ tends to decrease, but the resistance of resistor 30 is changed so that the current through regulating field windings 22 and 23 increases and the voltage generated in motor armature section 126B increases with the net result that the dynamotor speeds up in order that the physical relations represented by Equation 3 above may be satisfied. It is understood, of course, that in the classical dynamotor having a single field and a motor armature winding and a generator armature winding, and in which the motor armature and field coil are both energized from the same source of potential, the speed of the dynamotor is relatively unaffected by changes in the voltage of the source. Therefore, when $E_{126B}$ is increased, voltage $E_{126A}$ must correspondingly increase as by an increase in speed of the dynamotor. However, when the speed of the dynamotor increases the voltage generated in both sections of the generator armature winding must necessarily increase proportionately.

Thus, the effect of changing resistor 30 is, first, to increase directly the voltage $E_{127B}$ and, second, to increase the voltage generated in both of the generator armature sections by producing a speed change in the dynamotor. In apparatus producing only the first of the two above described functions, the carbon resistor 30 is needlessly of large size and large range for the same degree of regulation.

The voltage relationships in the dynamotor of Figure 3 are shown in Figure 5 in which the voltage of source $E_b$ is plotted as abscissa and output voltage between the brushes running on commutator 29 is plotted as ordinate. The curve H shows the desired dynamotor output voltage $E_G$ constant with respect to dynamotor input voltage $E_B$. Curve J shows the variation of voltage in the generator armature section 127A with respect to dynamotor input voltage $E_B$; curve K represents the variation of a corrective voltage which must be added to corresponding voltages on curve J to obtain the desired voltage as shown by curve H. Curve L represents the variation of the component of corrective voltage due to change in speed of the dynamotor when the current through carbon resistor 30 is changed an amount $\Delta I_F$ in the direction indicated on Figure 5; as $E_B$ increases, $\Delta I_F$ decreases and conversely as $E_B$ decreases $\Delta I_F$ increases. Curve M represents the variation of the component of corrective voltage which is due to the direct effect of magnetic flux on generator armature winding 127B, and curve L is representative of changes in voltages in both sections of the generator armature winding because of change in speed of the dynamotor. Voltages corresponding to points on curves M and L at the same voltage $E_B$ when added, give voltages corresponding to points on curve K.

Since the slope of curve M is smaller than the slope of curve K, the resistor 30 may be made of much smaller size to produce curve M than to produce curve K without curve L.

This effect is fundamentally the same differential action as was explained in connection with the arrangement shown in Figure 1. In the case of the arrangement shown in Figure 1, the differential action was provided between two opposing fluxes, of which one was adjusted. In the case of the arrangement shown in Figure 3, the differential action may be more easily perceived if it be regarded as existing between electromotive forces induced in the various parts of the armature windings. In any case, the net result is the same in that the amount of adjustment of resistance 30 required to produce a predetermined regulating effect is much smaller when the differential effect is utilized, and consequently the overall size and weight of the entire arrangement is very substantially reduced.

While, in the developed form of armature windings shown in Figure 4, the motor winding is wound straight through corresponding slots in cores 14 and 15 and the generator armature winding is reversed when passing from core 14 to core 15, it is entirely within the scope of the invention to make the generator armature windings pass straight between opposite slots of the cores 14 and 15 and to reverse the motor armature windings between the cores 14 and 15. In such case, of course, the coils 22 and 23 must be properly poled to produce the desired regulation in output voltage of the generator between the brushes running on commutator 29 in the same fashion as described above.

While the arrangements illustrated in Figures 1 and 3 have been described as fundamentally equivalent in that they both utilize the described differential effect, in specific situations the two arrangements have respectively different advantages. In any case, that type of construction should be chosen which requires a minimum number of ampere turns in field and armature windings for satisfactory performance and regulation. In general, for any particular arrangement, the design which conforms to this requirement can only be determined by a rough design of both types of machine.

While the coil 32 of the voltage regulator is illustrated in all cases as being energized by generator output voltage appearing across the brushes running on commutator 29, so that the regulator is effective to maintain the generator output voltage constant, it is entirely within the scope of the invention to maintain constant other electrical characteristics of the machine, such as output current or power of the generator or input current to the motor, or even battery voltage where the battery itself has somewhat appreciable internal resistance or changing voltage characteristics.

Figure 6:
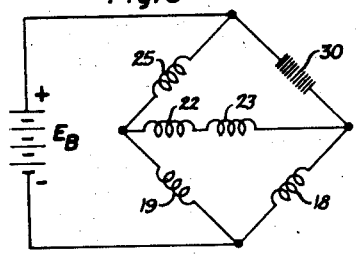
Figure 6 illustrates an alternative circuit arrangement of certain parts of the device illustrated in Figure 1.

Figure 6 illustrates a somewhat different form of control circuit for the dynamotor heretofore described and illustrated in Figure 1. The field windings, variable carbon resistor, and input voltage source $E_B$ form arms of a modified bridge circuit. Main field winding 19 is connected across the voltage source $E_B$ through a series circuit including differential field coil 25. The other main field winding 18 is connected across the voltage source $E_B$ through a series circuit including the variable carbon resistor 30. Main booster or regulating fields 22 and 23 are connected in series from a point between coils 19 and 25 to a point between coil 18 and resistor 30 and form a current path between the ends of main field coils 18 and 19. The control circuit shown in Figure 6 is particularly suitable for use where the current through the regulating windings 22 and 23 may be reversed, as is the case when the voltage relations shown in Figure 7 exist.

Figure 7:
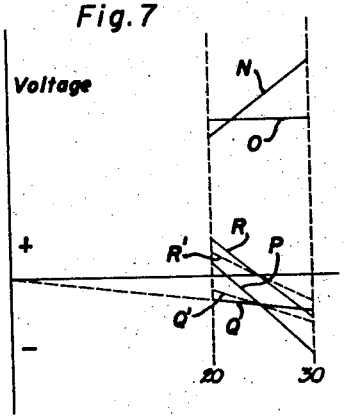
Figure 7 illustrates graphically certain operating characteristics of the device of Figure 1 with the circuit arrangements illustrated in Figure 6.

Referring to Figure 7, the curve O shows the desired characteristic of the dynamotor, the ordinate and abscissa being the same as those described in connection with Figures 2 and 5. Curve N shows the variation of voltage generated in the main armature section of the dynamotor due to the influence of main field 18 and 19. For purposes of analysis the curve N is considered to be substantially linear over the voltage range shown in full lines in Figure 7. Curve P represents the variation of corrective voltage which must be supplied from the auxiliary or booster portion of the dynamotor and added to the corresponding voltage represented by curve N to obtain the desired voltage represented by curve O. Curve Q (shown in full line) represents the variation of voltage which is induced in the auxiliary armature section of the dynamotor due to differential field 25. Curve R (shown in full line) represents the variation of voltage induced in the generator armature auxiliary section 27B due to current in the main booster windings or regulating windings 22 and 23. Corresponding ordinates on curves R and Q when added algebraically are equal to corresponding ordinates on corrective voltage curve P. In the absence of differential winding 25, resistor 30 would have to produce the variation shown in curve P. Resistor 30 need be of smaller range to produce curve R than to produce curve P.

It is noted that with the bridge arrangement shown in Figure 6 the current in the regulating or booster windings 22 and 23 is zero midway between the range of voltages of $E_B$ and assumes positive and negative values on either side of that midway point.

As seen from Figure 7, the smaller the slope of curve R the smaller must be the range of resistor 30 to produce the curve R. Another important feature of the circuit shown in Figure 6 is that it is possible with the particular arrangement of field coils and resistance 30 to make the slope of the curve R even less than is shown, so that it becomes curve R' (shown in dotted lines in Figure 7).

In the graphical representation shown in Figures 2 and 7 it is noted that the greater the slope of curves F and Q, the smaller need be the slopes of curves G and R in Figures 2 and 7, respectively, in order to produce the corrective voltage curves E and P. When E is 20 volts source $E_b$ of Figure 6 and the left-hand dotted vertical line of Figure 7, resistor 30 is adjusted to its lowest resistance and maximum current flows through it and through the main booster fields 22 and 23 and main fields 18 and 19. But since resistor 30, in effect, shunts the differential coil 25, that is, since an increased voltage appears across winding 19, the voltage across differential coil 25 is reduced by reduction of resistance 30, thus causing the left hand point on curve Q to appear as the left hand point on curve Q' (shown in dotted lines).

When $E_B$ is 30 volts, the resistor 30 is adjusted to its highest resistance and most of the current in the main booster or regulating fields 22 and 23 flows through differential field 25 and main field 18, thus causing an increased voltage to appear across differential coil 25 and causing displacement of the right hand point on curve Q to the right hand point on curve Q'. The net result is that the slope of the curve Q, by the adjustment of resistance 30 in the bridge circuit, is greater than would otherwise be expected as indicated by curve Q'. Consequently, the slope of curve R need be smaller to an extent indicated by curve R', and accordingly the resistor 30 need have a smaller range to produce curve R' than to produce curve R.

In all of the arrangements shown, the voltage induced in the auxiliary armature sections due to the action of the differential field 25 of the dynamotor preferably never exceeds the voltage induced in that auxiliary section due to the action of main booster field 22. The advantage of using the differential field 25 for reducing the range of carbon resistor 30 may be seen from the following specific case wherein differential winding 25 is fed from a constant voltage source, for example, from a constant voltage source $E_G$.

In such an arrangement where the differential winding 25 is operating $$E_G = E_{27A} + E_{27B} = E_{27A} + V_{22} - V_{25}$$

and when the differential winding 25 is absent $$E_G = E_{27A} + E_{27B} = E_{27A} + V_{22'}$$

where $E_{27A}$ and $E_{27B}$ represent voltages generated in those generator armature sections bearing reference numerals corresponding to the subscripts; where $V_{22}$ and $V_{25}$ represent voltages induced by regulating windings 22 and 25 respectively; and where $V_{22'}$ represents the voltage which must be induced by regulating field 22 when the differential field 25 is absent.

For a given voltage change in the generator armature section 27A equal to $\Delta E_{27A}$ the following percentage changes must occur in the voltage generated by the coil 22 in the two cases under consideration. When the field 25 is present the percent change is $$\frac{\Delta E_{27A}}{E_G + V_{25} - E_{27A}}$$

and when the field 25 is absent the percent change is $$\frac{\Delta E_{27A}}{E_G - E_{27A}}$$

Thus it is seen from the last two equations that the percent change in generated voltage produced by regulating coil 22 and associated resistor 30 must be higher when the regulating field 25 is absent.

Figure 8:
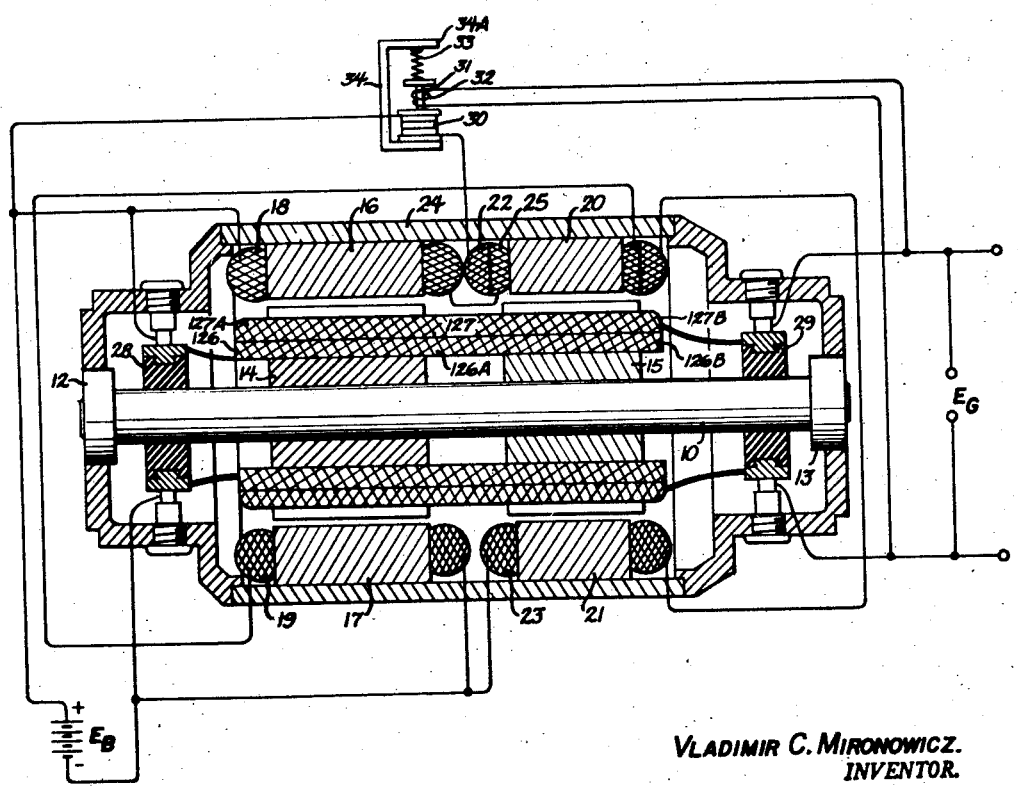
Figure 8 is another embodiment of the invention.

While the two fundamental forms of the invention have been illustrated as being provided with differentially acting field coils and differentially acting armature sections respectively, both of which utilize the same fundamental principle, it should also be understood that it is within the scope of the invention to utilize both such arrangements in a single machine. That is, the arrangement illustrated in Figure 1 may be provided with a rotor such as is illustrated in Figures 3 and 4 to compose the machine shown in Figure 8. In that machine a double differential action is attained which may be made to operate over an extremely wide range of adjustment, and which may be made to operate to maintain output voltage constant to a very high degree of accuracy. In such a machine, not only do the auxiliary field windings 22 and 23 cooperate with the differential field winding 25 and resistance 30 to provide better regulation through a smaller range of adjustment of resistance 30, but also the reverse motor or generator armature section under the auxiliary field reacts to the changing auxiliary field flux passing through it to provide an additional degree of regulation which requires even less adjustment of the resistance 30.

While I have shown and described the particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

I claim:

1. The combination in a dynamotor of an armature having a main portion and an auxiliary portion, each of said portions carrying both motor and generator windings, the motor and generator windings of said auxiliary portion being reversed with respect to each other, the motor and generator windings of said main portion being in aiding relationship to each other, field windings having a main portion and an auxiliary portion corresponding respectively to the main and auxiliary portions of said armature, said auxiliary field winding having magnetically opposed parts, means for supplying current to said motor armature windings, to said main field winding and in addition to one of the magnetically opposed parts of said auxiliary field winding, and means for supplying current to the other magnetically opposed part of said auxiliary field winding in amounts corresponding in a predetermined manner with an electrical quantity measured in said dynamotor.

2. The combination in a dynamotor of an armature having a main portion and an auxiliary portion, each of said portions carrying both motor and generator windings, field windings having a main portion and an auxiliary portion corresponding respectively to the main and auxiliary portions of said armature, means for supplying current to said motor armature windings and to said main field winding portion, and means for supplying current to said auxiliary field winding portion in amounts corresponding in predetermined manner with an electrical quantity measured in said dynamotor, said motor and generator armature windings of said auxiliary armature portion being reversed with respect to each other, the motor and generator armature windings of said main armature portion being in aiding relation to each other, whereby the regulating effect of said last current supplying means is increased.

VLADIMIR C. MIRONOWICZ.

REFERENCES CITED

The following references are of record in the file of this patent:

UNITED STATES PATENTS

| Number | Name | Date |
|---|---|---|
| 2,018,107 | Allen | Oct. 22, 1935 |
| 1,436,152 | Churchward | Nov. 21, 1922 |
| 459,423 | Thomson | Sept. 15, 1891 |